United States Patent
Rumsey (10) Patent No.: US 9,472,934 B2
(45) Date of Patent: Oct. 18, 2016

(54) ENCLOSURE FOR ELECTRICAL EQUIPMENT

(71) Applicant: Paige Electric Company, LP, Union, NJ (US)

(72) Inventor: Roger L. Rumsey, Wichita, KS (US)

(73) Assignee: PAIGE ELECTRIC COMPANY, LP, Union, NJ (US)

( * ) Notice: Subject to any disclaimer, the term of this patent is extended or adjusted under 35 U.S.C. 154(b) by 0 days.

(21) Appl. No.: 14/305,754

(22) Filed: Jun. 16, 2014

(65) Prior Publication Data

US 2014/0374412 A1  Dec. 25, 2014

Related U.S. Application Data

(60) Provisional application No. 61/838,592, filed on Jun. 24, 2013.

(51) Int. Cl.
*H02G 3/08* (2006.01)

(52) U.S. Cl.
CPC .............. *H02G 3/08* (2013.01); *H02G 3/081* (2013.01)

(58) Field of Classification Search
CPC .............................................. H02G 3/08–3/20
See application file for complete search history.

(56) References Cited

U.S. PATENT DOCUMENTS

| | | |
|---|---|---|
| 2,345,792 A | 4/1944 | Cann |
| 3,386,606 A | 6/1968 | Pastrick |
| 3,584,136 A | 6/1971 | Robert |
| 4,715,507 A | 12/1987 | Chamberlin |
| 5,272,279 A | 12/1993 | Filshie |
| 5,673,522 A | 10/1997 | Schilham |
| 6,156,971 A * | 12/2000 | May .................. H01R 24/76 174/59 |
| 6,218,613 B1 * | 4/2001 | Justiniano ............ H02G 3/081 174/50 |
| 6,238,028 B1 | 5/2001 | Benner et al. |
| 6,274,809 B1 * | 8/2001 | Pudims ................. H02G 3/185 174/486 |
| 6,348,655 B1 | 2/2002 | Wright |
| 6,605,777 B1 | 8/2003 | Anderson et al. |
| 7,109,415 B2 | 9/2006 | Neitzel et al. |
| 7,207,830 B2 | 4/2007 | Conway |
| 7,381,907 B1 | 6/2008 | Frusco |
| 7,569,770 B2 | 8/2009 | Remmert et al. |
| 7,825,336 B2 * | 11/2010 | Peck .................... H01R 13/514 174/50 |
| RE42,258 E | 3/2011 | Thompson et al. |
| RE43,502 E | 7/2012 | Baxter et al. |
| 2003/0080123 A1 * | 5/2003 | Weise .................... H02G 3/086 220/3.8 |
| 2006/0042813 A1 | 3/2006 | Neitzel et al. |
| 2010/0096157 A1 | 4/2010 | Diening et al. |
| 2011/0192626 A1 | 8/2011 | Chen et al. |
| 2012/0325808 A1 * | 12/2012 | Batchelor .............. H02G 3/123 220/3.8 |

* cited by examiner

*Primary Examiner* — Anthony Stashick
*Assistant Examiner* — Mollie Llewellyn
(74) *Attorney, Agent, or Firm* — Cook Alex Ltd.

(57) ABSTRACT

An enclosure for an electrical device includes a five-sided case with an open side closable by a removable cover. First and second pocket plates are mounted in the case and ogether with a side wall of the case define a compartment for receiving the electrical device. The first pocket plate flexes away from a side wall of the case to enlarge the opening into the compartment for receiving the electrical device. Once the electrical device is in the compartment the first pocket plate is biased into engagement with the device to retain it in the compartment. The second pocket plate is spaced from the back wall of the case to prevent contact between the electrical device and the back wall.

20 Claims, 9 Drawing Sheets

ENCLOSURE FOR ELECTRICAL EQUIPMENT

CROSS-REFERENCE TO RELATED APPLICATION

This application claims the benefit of U.S. application Ser. No. 61/838,592, filed Jun. 24, 2013, the disclosure of which is incorporated herein in its entirety.

FIELD OF THE DISCLOSURE

The present disclosure is directed to enclosures for protecting electrical equipment. Such enclosures are commonly referred to as electrical boxes.

BACKGROUND

Electrical equipment often has to be separated from its surrounding environment for the protection of both the equipment and the environment. There are endless examples of the need for electrical boxes which enclose all sorts of electrical equipment to protect the equipment from the weather and to prevent unauthorized or unintended access to or tampering with the equipment. Switches, fuses, circuit breakers, circuit boards are but a few examples. The present invention is particularly suitable to an enclosure for mounting transformers designed for powering LED's used in signs and the like. However, it will be understood that the invention is not limited to use with transformers and that any electrical equipment could be mounted in the enclosure.

SUMMARY

In one aspect, the present disclosure concerns an electrical box manufactured from galvanized sheet metal. The box has a generally rectangular, five-sided case with an open side which is closable by a removable cover. The case preferably may be made of a single piece of sheet metal folded and fastened together by cinching. The cover is a single piece. The interior of the case is fitted with first and second pocket plates. The first pocket plate has a forward edge closest to the open side of the case. The first pocket plate is joined to the second pocket plate. The second pocket plate is spaced from the back wall of the case. Together the first and second pocket plates and one of the side walls of the case define a generally three-sided compartment within the cavity for receiving a piece of electrical equipment, e.g., a transformer. The space between the side wall and the forward edge of the first pocket plate defines an opening into the compartment. The first pocket plate is movable to permit adjustment of the size of the opening into the compartment. In one embodiment this movement is created by flexing the first pocket plate in a direction away from the side wall to permit enlargement of the opening into the compartment. An electrical device placed in the compartment will be held in position by the bias of the first pocket plate against the device.

BRIEF DESCRIPTION OF THE DRAWINGS

FIGS. 14-30 illustrate an alternate embodiment of the present disclosure.

DETAILED DESCRIPTION

The present disclosure is directed to an enclosure for electrical equipment, commonly called an electrical box. The enclosure is preferably made of 25 gauge galvanized sheet metal, although other materials or material thicknesses could be used. The enclosure is shown generally at 10 in FIGS. 1-3. The enclosure has two main parts, a case 12 and a removable cover 14. The case 12 is a five-sided structure having side, top and bottom walls that define an open side 16 at its front. The open side 16 provides access to a cavity 18 defined within the walls of the case 12. When the removable cover 14 is installed on the case, as in FIG. 2, the cover closes the open side 16 of the case. When the cover 14 is removed from the case, as in FIG. 1, access to the cavity 18 is available through the open side 16. The cover may be retained in its installed or closed position by removable fasteners such as sheet metals screws 20 that fit through screw holes 21 in both the cover 14 and the case 12.

Figure 1:
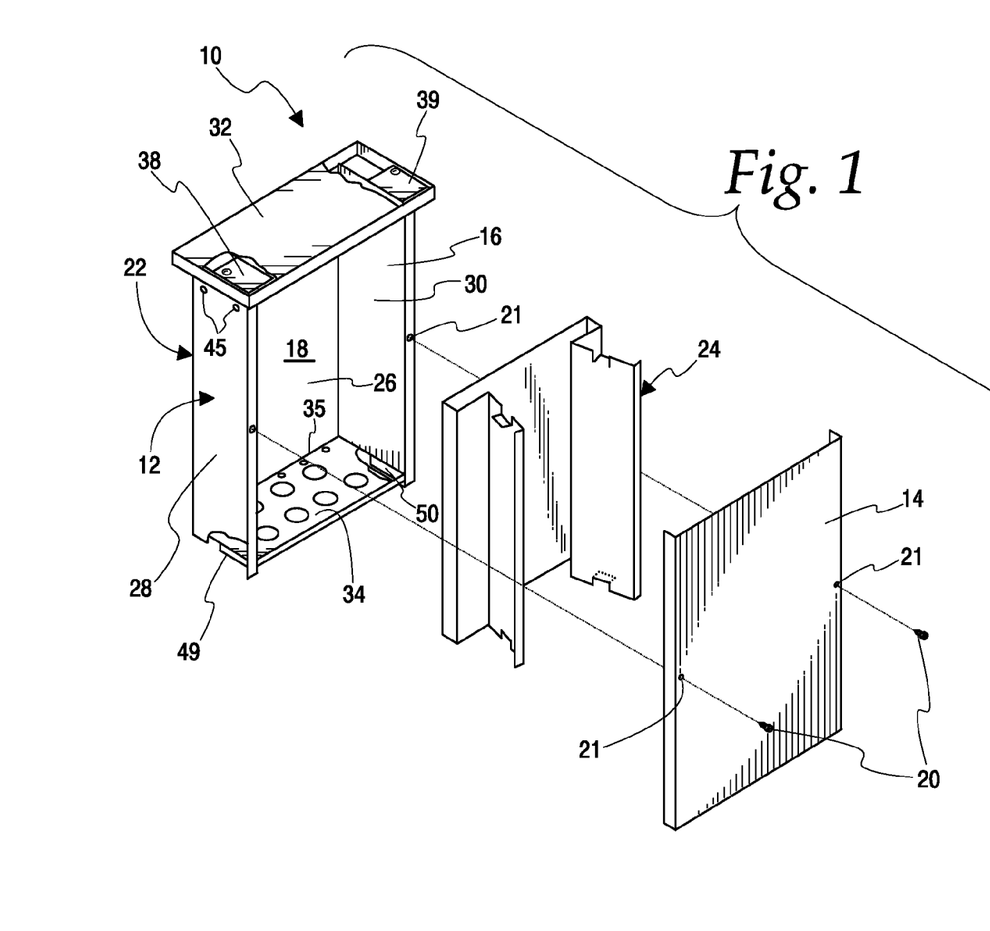
FIG. 1 is an exploded perspective view of the electrical enclosure according to a first embodiment of the disclosure and with portions of the top wall cut away to more clearly show certain interior structure.
Figures 3, 7:
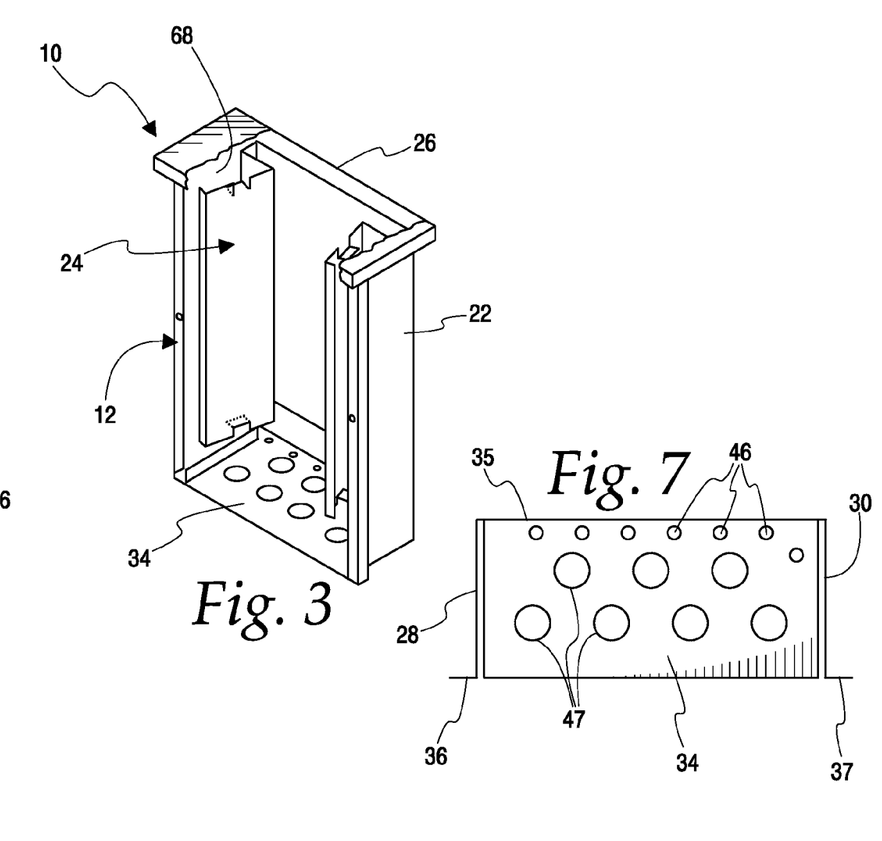
FIG. 3 is a view similar to FIG. 2 but with the cover removed and a portion of the top wall cut away to more clearly show the insert mounted in the shell.
FIG. 7 is a cross-sectional view taken along line 7-7 of FIG. 4.

As seen in FIGS. 1 and 3, the case 12 may be made from two parts, a shell 22 and an insert 24. Details of the shell 22 are seen in FIGS. 4-7. It includes a back wall 26, left and right side walls 28, 30, a top wall 32 and a bottom wall 34.

The front or forward edges of the side walls and top and bottom walls define the open side 16 of the case 12. The left side wall 28 is joined to the back wall 26 at a vertical fold line 29 and extends generally perpendicularly to the back wall. Similarly, the right side wall 30 is joined to the back wall 26 at a vertical fold line 31 and extends generally perpendicularly to the back wall. The top wall 32 is similarly joined to the back wall 26 at a horizontal fold line 33 at the upper end of the case. The bottom wall 34 is also joined to the back wall 26 at a horizontal fold line 35 (FIG. 1) at the lower end of the case.

The front or free edge of the left side wall 28 joins a stand-off flange 36 which extends the entire height of the side wall. The stand-off flange 36 extends away from the vertical centerline of the shell 22, in a plane generally parallel to the back wall 26. A similar stand-off flange 37 extends from the right side wall 30. By way of example only, the stand-off flanges 36, 37 may extend at least about half an inch from the side walls.

The top edge of the left side wall 28 has an ear or tab 38 (FIG. 1) attached to it at a fold line. The ear 38 extends from the left side wall 28 away from the vertical centerline of the shell 22, in a plane generally parallel to the top wall 32. A similar ear 39 extends from the top edge of the right side wall 30. By way of example only, the ears 38, 39 may extend at least about an inch from the side walls.

Returning to FIGS. 4-6, the top wall 32 includes a horizontal body portion 40 which is bounded at its front and sides by skirt segments. There is a front skirt segment 41 and left and right skirt segments 42 and 43. The skirt segments 41-43 are bent down about fold lines 44 into vertical planes. The distance between the internal faces of the right and left skirt segments 42, 43 is slightly greater than the distance between the free, outside edges of the ears 38, 39 on the outer shell's side walls 28, 30. Thus, there is only a slight clearance between the skirt segments 42, 43 and the ears 38, 39, just enough to allow the top wall 32 to fold down on to the top edges of the side walls. The top wall is cinched to the ears as at 53 in FIG. 6. A plurality of vent holes 45 (FIG. 5) are punched in both side walls just beneath the ears. The vent holes permit air to flow out the top of the case.

Figures 4, 5:
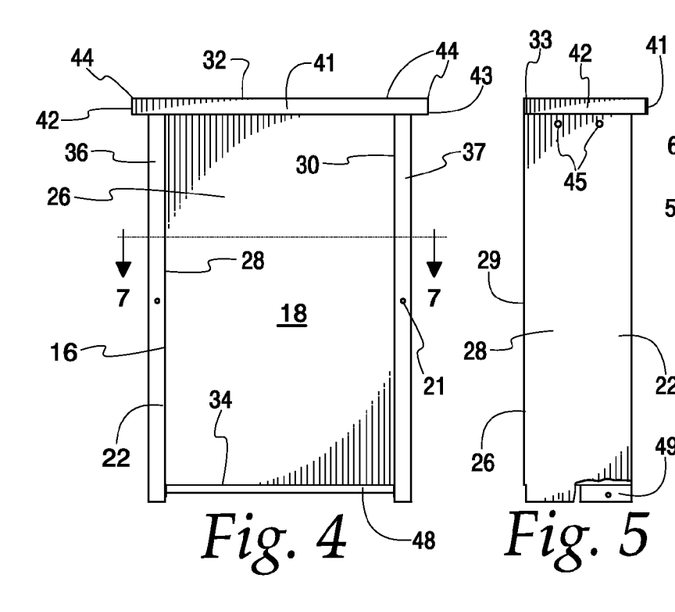
FIG. 4 is a front elevation view of the shell.
FIG. 5 is a left side elevation view of the shell with a portion of the bottom edge cut away.
Figure 6:
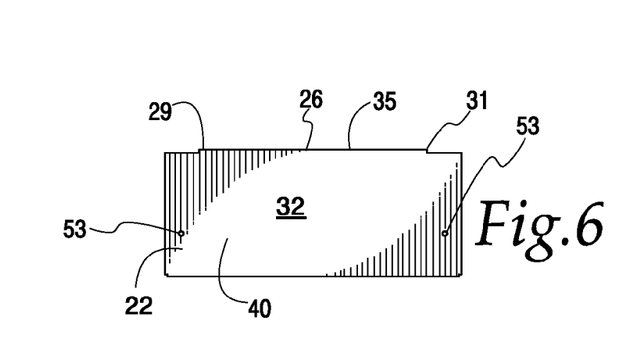
FIG. 6 is a top plan view of the shell.

As seen in FIG. 4, the body portion 40 of the top wall is sized such that the left and right skirt segments 42 and 43 are spaced laterally of the side walls 28, 30. As seen in FIG. 5, the body portion 40 of the top wall is sized such that the front skirt segment 41 is spaced forwardly of the side walls 28, 30. Thus, the top wall overhangs the shell 22 on three sides. The overhanging portions serve two purposes. First, they provide an umbrella or hood over the vent holes 45 to help prevent entry of water, ice and snow into the vent holes. Second, the overhanging portions of the top wall 32, together with the stand-off flanges 36, 37 prevent mounting of the enclosure in a manner that would place the entirety of either side wall 28 or 30 in contact with any adjacent flat structure such as a wall.

Some features of the bottom wall 34 are best seen in FIG. 7. A plurality of vent holes 46 are formed along the rear edge of the bottom plate near the fold line 35. These vent holes cooperate with the upper vent holes 45 to create a chimney effect for circulating air through the closed enclosure 10. Air heated by the electrical equipment will rise and escape through the upper vent holes 45. The departing air is replaced by cooler, ambient air entering through the lower vent holes 46. This naturally induced air flow helps prevent the electrical equipment in the enclosure from overheating. The bottom wall 34 further includes a plurality of knockouts 47. The knockouts can be removed in the usual manner to provide access openings for conduit or electrical cables entering the enclosure.

The bottom wall 34 has a downwardly-extending lip 48 (FIG. 4) on its front edge. The vertical extent of the lip is small enough to prevent interference with a wrench that needs to access nuts for conduit connectors and the like located on the underside face of the bottom wall 34. The lip 48 extends the full width of the bottom wall 34. The side edges of the bottom wall have depending flaps 49, 50 (FIGS. 1 and 5) extending in a vertical plane below the bottom wall a distance beyond the extent of the lip 56. The flaps provide an anchoring location for fastening the bottom wall to the side walls. That is, the left flap 49 is cinched to the left side wall 28 and the right flap 50 is cinched to the right side wall 30.

The width of the bottom wall 34, including the flaps 49, 50, is slightly less than the internal distance between the side walls 28, 30, with only sufficient clearance to allow the bottom wall to slide in between the side walls during assembly of the shell 22. Thus, even before cinching there is effectively no lateral play between the flaps 49, 50 and the side walls 28, 30. It will be further noted that the bottom wall 34 is recessed upwardly from the lowermost edges of the shell 22 and cover 14. This provides a hood around the bottom wall 34 that affords resistance to entry of moisture through the lower vent holes 46 or the knockouts 47.

Figure 8:
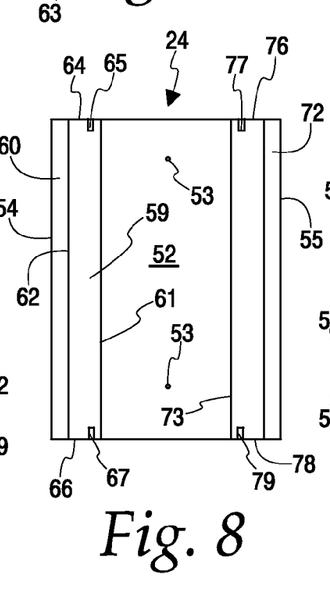
FIG. 8 is a front elevation view of the insert.
Figure 9:
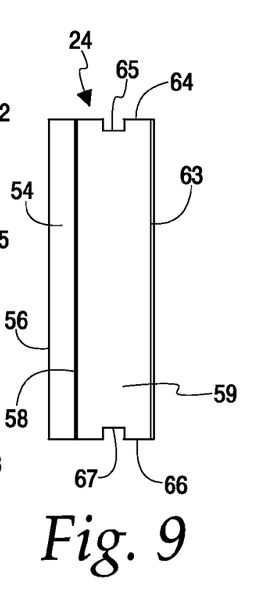
FIG. 9 is a left side elevation view of the insert.
Figure 10:
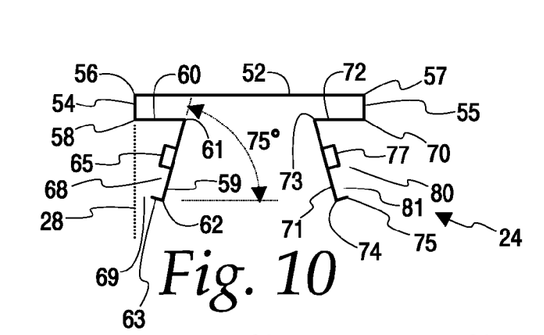
FIG. 10 is a top plan view of the insert, with a portion of the shell side walls shown schematically.

Details of the insert 24 are seen in FIGS. 8-10. The insert has a rear plate 52 that lies flush against the back wall 26 of the shell 22. The rear plate is cinched to the back wall in two places as shown at 53. The width of the rear plate is such that it fits just inside the facing interior surfaces of the side walls 28 and 30. The side edges of the rear plate 52 join left and right separator flanges 54 and 55 at fold lines 56 and 57, respectively. The left and right separator flanges 54, 55 lie parallel to and immediately adjacent to a respective one of the left and right side walls 28, 30.

The forward edge of the left separator flange joins a pair of pocket plates at a fold line 58. There is a first pocket plate 59 and a second pocket plate 60 which are themselves joined at a fold line 61. The included angle between the first and second pocket plates 59, 60 as seen in FIG. 10 may be, by way of example only, about 75°. Thus, the first pocket plate 59 in its rest position seen in FIG. 10 is not parallel to the left side wall 28 but rather is angled with respect thereto. The pocket plates extend the same height as the rear plate 52. The second pocket plate 60 is attached at fold line 58 to the left separator flange 54. In the embodiment shown the second pocket plate 60 is generally parallel to the rear plate 52, although it could be otherwise.

The forward edge 62 of the first pocket plate 59 carries an outwardly turned flange 63. A pair of spaced, vertical slits extend from the top edge 64 of the first pocket plate 59 to a fold line where a downturned tab forms an outwardly facing head 65. A pair of spaced, vertical slits extend from the bottom edge 66 of the first pocket plate 59 to a fold line where an upturned tab forms an outwardly facing foot 67.

The first and second pocket plates 59, 60, together with the left side wall 28 define a generally three-sided compartment 68 within the cavity 18 of the case. This cavity receives an electrical device, such as a transformer. Note that the left side wall 28 is in facing relation with the first pocket plate 59. The space between the left side wall 28 and the forward edge 62 of the first pocket plate 59 defines an opening 69 into the compartment 68.

The insert 24 also has parts that are essentially mirror images of the first and second pocket plates. Thus, the forward edge of the right separator flange 55 joins a pair of pocket plates at a right pocket plate fold line 70. There is a third pocket plate 71 and a fourth pocket plate 72 which are themselves joined at a fold line 73. The included angle between the third and fourth pocket plates 71, 72 as seen in FIG. 10 may be, by way of example only, about 75°. Thus, the third pocket plate 71 in its rest position seen in FIG. 10 is not parallel to the right side wall 30 but rather is angled with respect thereto. The third and fourth pocket plates extend the same height as the rear plate 52. The fourth pocket plate 72 is attached at fold line 70 to the right separator flange 55. In the embodiment shown the fourth pocket plate 72 is generally parallel to the rear plate 52, although it could be otherwise.

The forward edge 74 of the third pocket plate 71 carries an outwardly turned flange 75. A pair of spaced, vertical slits extend from the top edge 76 of the third pocket plate 71 to a fold line where a downturned tab forms an outwardly facing head 77. A pair of spaced, vertical slits extend from the bottom edge 78 of the third pocket plate 71 to a fold line where an upturned tab forms an outwardly facing foot 79.

The third and fourth pocket plates 71, 72, together with the right side wall 30 define a second, generally three-sided compartment 80 within the cavity 18 of the case. This cavity receives a second electrical device, such as a transformer. Note that the right side wall 30 is in facing relation with the third pocket plate 71. The space between the right side wall 30 and the forward edge 74 of the third pocket plate 71 defines an opening 81 into the second compartment 80.

Figure 11:
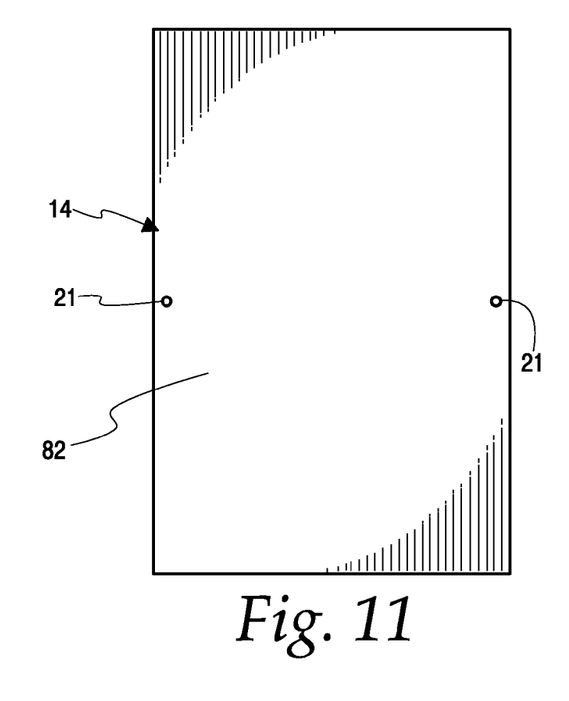
FIG. 11 is a front elevation view of the cover.
Figure 12:
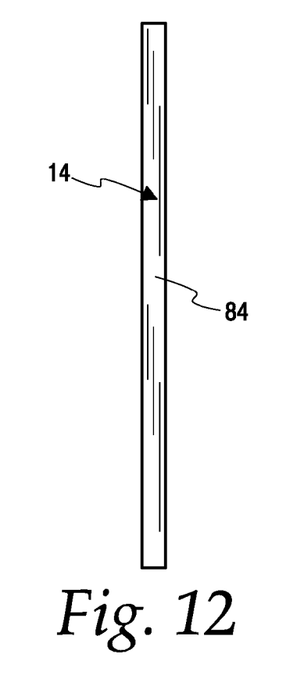
FIG. 12 is a side elevation view of the cover.
Figure 13:
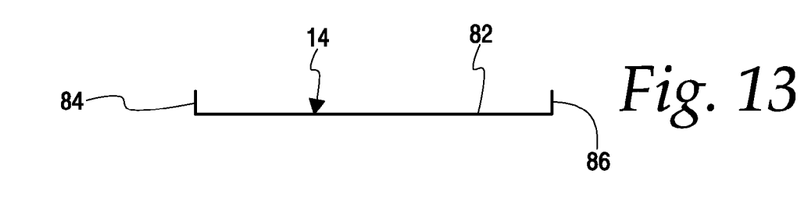
FIG. 13 is a top plan view of the cover.

The cover 14 is shown in detail in FIGS. 11-13. The cover is a simple channel section having a rectangular body portion 82 bounded on either side by flanges 84 and 86 which extend out of the plane of the body portion 82. The separation between the facing surfaces of the flanges 84, 86 is slightly greater than the distance between the outer or free edges of the stand-off flanges 36, 37. As such, the stand-off flanges center the cover 14 on the case 12. The screws 20 fit through screw holes 21 in the body portion 82 to fasten the cover to the case.

Figure 10A:
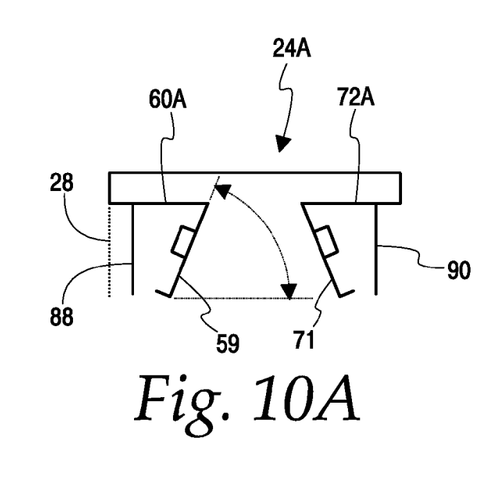
FIG. 10A is a top plan view of an alternate embodiment of the insert, with a portion of the left side wall shown schematically.

In some environments it may be desirable to assure that the electrical device is spaced from all surfaces of the shell 22. An alternate embodiment of the insert, shown in FIG. 10A at 24A, serves this purpose. The insert 24A differs from insert 24 in that insert 24A has somewhat longer second and fourth pocket plates 60A and 72A, respectively. This places the first and third pocket plate 59 and 71 closer to the vertical centerline of the case and provides room for a spacer in each compartment. Spacer 88 is preferably attached to the second pocket plate 60A while spacer 90 is preferably attached to the fourth pocket plate 72A. The spacers are arranged to prevent an electrical device installed in a compartment from contacting that compartment's side wall. While a plate-like spacer is shown, it will be understood that other structures could be used to hold the electrical device away from the side wall. For example, a plurality of pegs or posts, extending either from the second or fourth pocket plates or from the side walls, could be used to prevent contact with the side wall.

Figure 2:
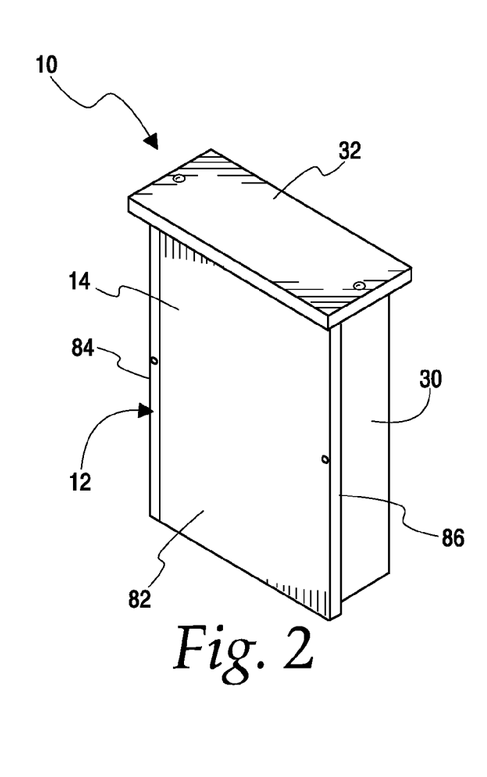
FIG. 2 is a perspective view of the complete enclosure assembly according to the first embodiment.

The use, operation and function of the electrical enclosure are as follows. The enclosure 10 is mounted on a wall, an electrical panel, sign board or the like, typically by screws extending through the back wall. The enclosure will most commonly be oriented as shown in FIGS. 1-3, i.e., with the long dimensions vertical, but it could be otherwise. The cover 14 can be taken off by removing the screws 20 to release the cover. This provides access to the cavity 18 through the open side 16 of the case 12. An electrical device can be installed in one of the compartments 68 or 80. Using compartment 68 as an example, the electrical device itself can be used to engage the forward edge 62 of the first pocket plate 59 and/or the flange 63 and push the first pocket plate 59 away from the right side wall 28. The first pocket plate acts as a spring as it flexes about the three fold lines 56, 58 and 61. This enlarges the opening 69 into compartment 68, moving the first pocket plate from its rest position to an open position wherein the electrical device is able to fit into the compartment 68. Once the electrical device is fully within the compartment, the first pocket plate typically will return in the direction of the rest position, but it will not completely reach the rest position. Instead, the first pocket plate will obtain a flexed position intermediate the open position and the rest position. In the flexed position the first pocket plate 59 is biased to apply a spring load to the electrical device that will press the electrical device against the left side wall 28 and retain the device in the compartment 68. Once the electrical device is in the compartment it will rest on the foot 67 to keep the device spaced from the bottom wall 34. If the enclosure is oriented in a non-standard manner (other than with its long dimensions vertical) the head 65 may also come into play to hold the electrical device in place. Similarly, in some situations the flange 63 on the first pocket plate may be needed to help retain the electrical device in the compartment. With the electrical device secured in the compartment the user can make the necessary electrical connections to it with the wires extending through the holes in the bottom wall 34 where one or more of the knockouts 47 has been removed. Then the cover 14 can be replaced and held by the screws 20.

It can be seen that the spring-loaded first pocket plate retains the electrical device in place without the need for separate fasteners such as screws, bolts or the like. The user simply presses the electrical device in place and the first pocket plate flexes to first receive and then retain the electrical device in the compartment. Removal of the device for repair or replacement is equally straightforward. The user simply disconnects the wires and pulls the device out of the compartment. The first pocket plate will flex to permit removal. It will be understood that the third pocket plate 71 operates in a similar manner to retain a second electrical device in the second compartment 80. Obviously if only one electrical device is installed, it could go in either of the compartments 68 or 80.

It will also be noted that the second and fourth pocket plates 60, 72 maintain the electrical device in a position where the device is spaced from the back wall 26 of the shell 22. Together with the action of the stand-off flanges 36, 37 described above, this assures there is always an air space around the electrical device to maintain proper cooling of the device.

An alternate embodiment of the electrical enclosure of the present disclosure is shown generally at 110 in FIGS. 14-30. As in the first embodiment, the enclosure 110 is preferably made of 25 gauge galvanized sheet metal, although other materials or material thicknesses could be used. The enclosure has two main parts, a case 112 and a removable cover 114. The case 112 is a five-sided structure having walls that define an open side 116 at its front. The open side 116 provides access to a cavity 118 defined within the walls of the case 112. When the removable cover 114 is installed on the case, as in FIG. 15, the cover closes the open side 116 of the case. When the cover 114 is removed from the case, as in FIG. 14 access to the cavity 118 is available through the open side 116. The cover may be retained in its installed or closed position by removable fasteners such as sheet metal screws 120 that fit through screw holes 121 in both the cover 114 and the case 112.

Figure 14:
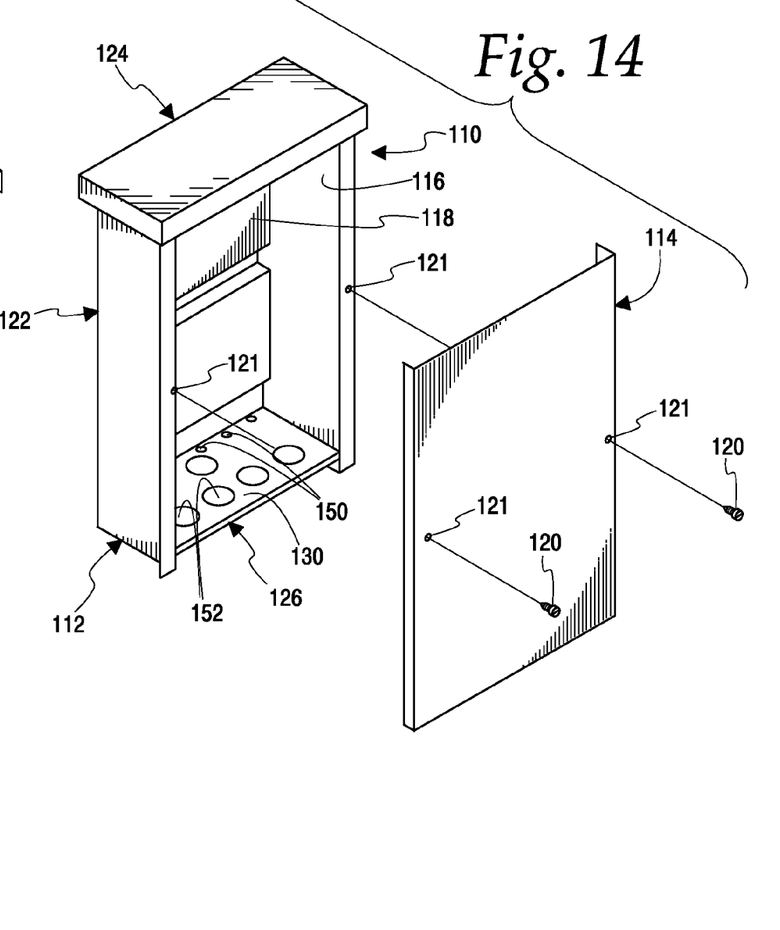
FIG. 14 is an exploded perspective view of the alternate embodiment.
Figure 15:
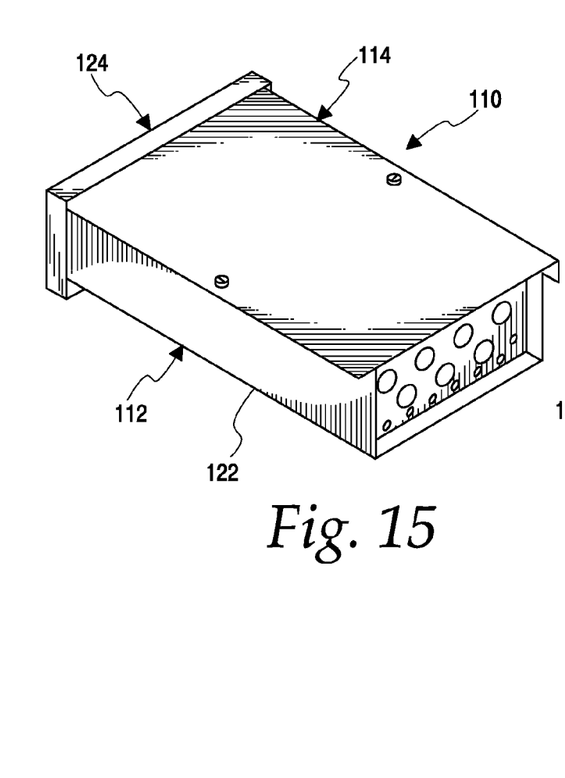
FIG. 15 is a perspective view of the enclosure assembly rotated from the orientation of FIG. 14 to illustrate the bottom plate.
Figure 16:
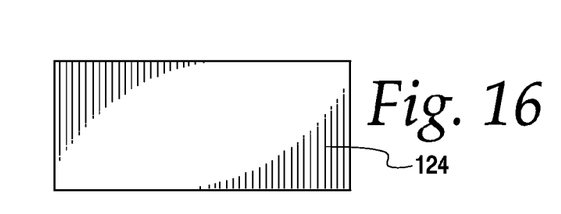
FIG. 16 is a top plan view of the enclosure assembly.
Figure 17:
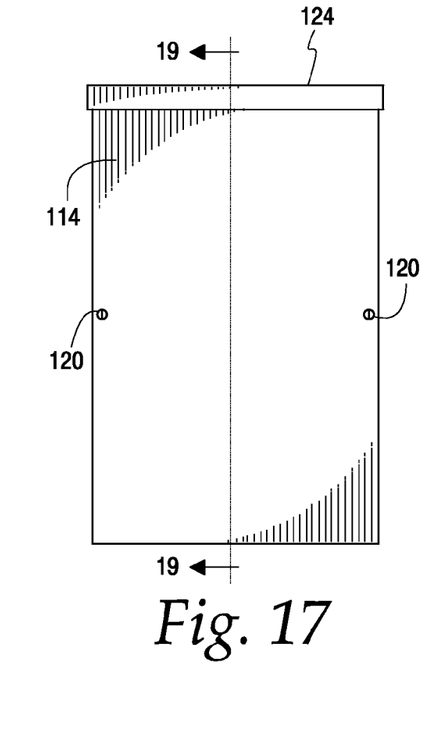
FIG. 17 is a front elevation view of the enclosure assembly.
Figure 18:
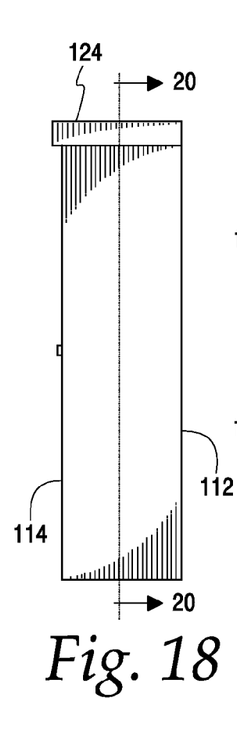
FIG. 18 is a side elevation view of the enclosure assembly.
Figure 19:
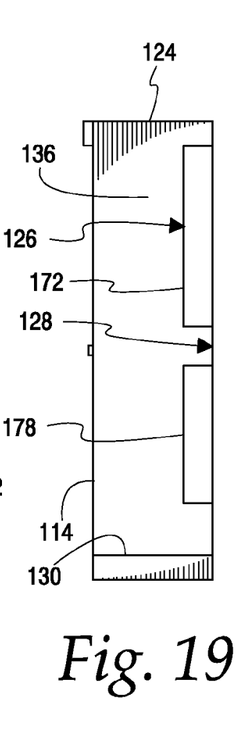
FIG. 19 is a section taken along line 19-19 of FIG. 17.
Figure 20:
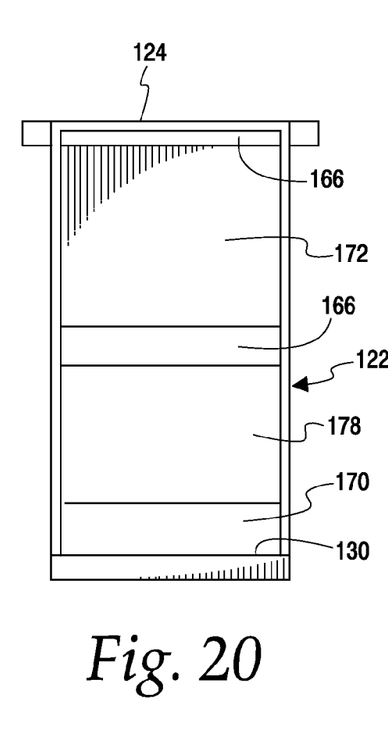
FIG. 20 is a section taken along line 20-20 of FIG. 18.

FIGS. 16-21 further illustrate the enclosure assembly 110. In this embodiment the case 112 may be made from three parts, an outer shell 122, a top cap 124 and an insert 126. The insert 126 is seen in FIGS. 14, 19 and 20 and includes a back plate 128 and a bottom plate 130. The bottom plate 130 extends at an angle from the back plate 128 such that in the normal orientation of the box (as shown in all of FIGS. 14-21 except FIG. 15) the back plate 128 is generally vertical and the bottom plate 130 is generally horizontal. The three parts of the case 112 are joined together in such a manner to make the case 112 rigid. The preferred joining method entails cinching the parts together. Cinching is preferred because it does not damage the galvanized finish on the sheet metal as spot welding does.

Figures 21, 22, 23, 24:
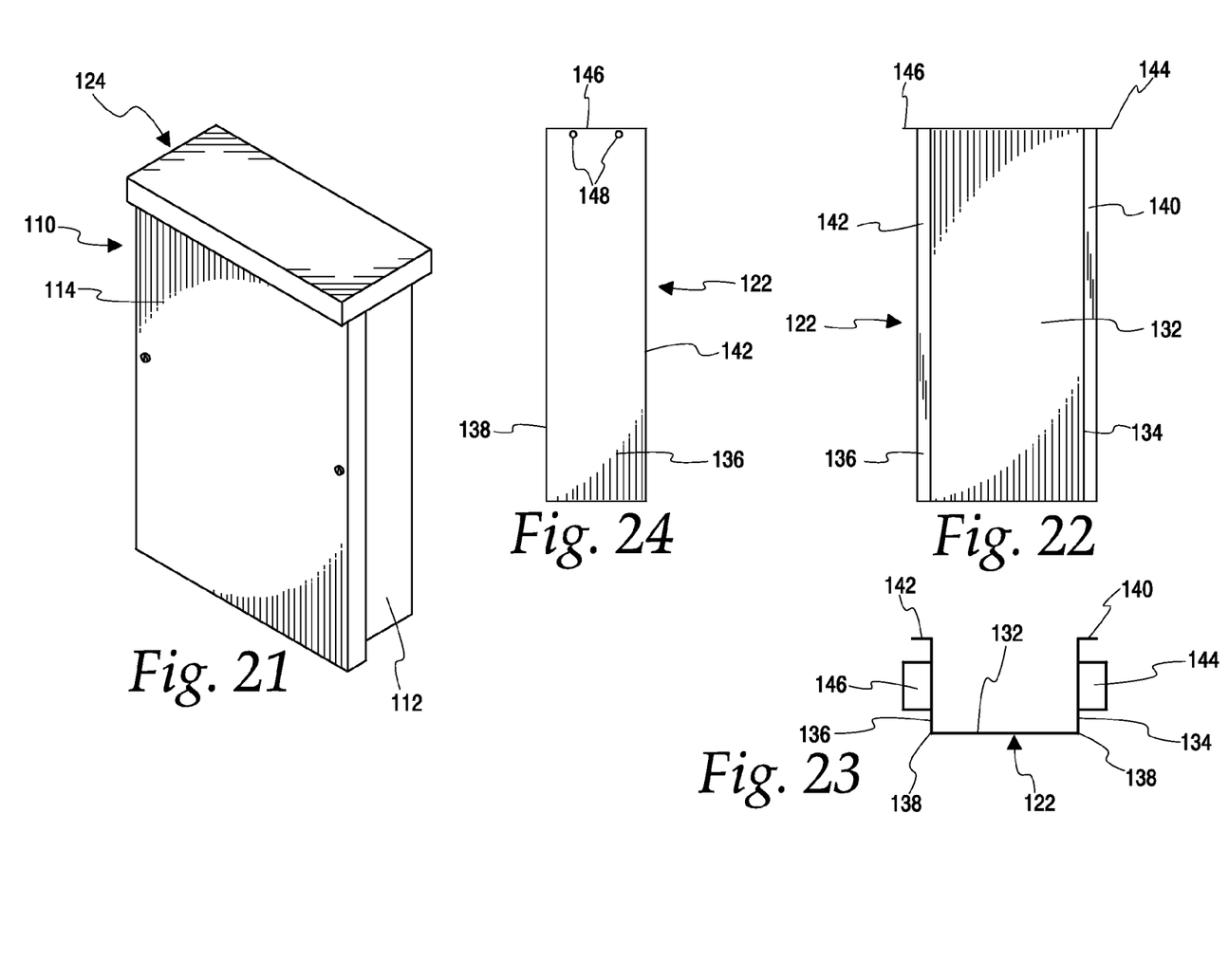
FIG. 21 is perspective view of the enclosure assembly.
FIG. 22 is a front elevation view of the outer shell.
FIG. 23 is a bottom plan view of the outer shell.
FIG. 24 is a side elevation view of the outer shell.

Turning now to the details of the individual parts, FIGS. 22-24 show the outer shell 122. It is an elongated hat-shaped channel that includes a central back wall 132 and first and second side walls 134, 136. The side walls are joined to the back wall 132 at fold lines 138 and extend generally perpendicularly to the back wall. The front or free edge of the side wall 134 joins a stand-off flange 140 which extends the entire height of the side wall. The stand-off flange 140 extends away from the vertical centerline of the outer shell 132, in a plane generally parallel to the back wall 132. A similar stand-off flange 142 extends from the side wall 136. The stand-off flanges 140, 142 extend at least about half an inch from the side walls. Together with the top cap 124, the stand-off flanges 140, 142 prevent mounting of the enclosure in a manner that would place the entirety of a side wall 134 or 136 in contact with any adjacent flat structure such as a wall. The outer shell 122 is completed by a pair of ears 144, 146 attached to the top edges of the side wall 134 and 136, respectively. Each ear 144, 146 extends normal to the side wall 134 and away from the vertical centerline of the outer shell 122. The ears 144, 146 extend laterally somewhat beyond the free edges of the stand-off flanges 140, 142. The ears are sized to engage the skirt of the top cap 124 and thereby center the top cap on the outer shell 122. The ears also provide anchoring locations for fastening the top cap 124 to the outer shell 122. That is, the top cap is cinched to the ears.

Just below the ears are a pair of vent holes 148 (FIG. 24). The vent holes permit air to flow out the top of the case. The ventilation holes provided at both the top and bottom of the case to permit a chimney effect wherein air can flow freely from the bottom of the box to the top to allow the heat produced by the electrical equipment to dissipate to the exterior of the box. As the hot air rises and exits through the holes in the top of the case, cool air is drawn in through the bottom holes.

Turning now to details of the insert 126, some features of the bottom plate 130 are best seen in FIG. 14. A plurality of vent holes 150 are formed along the rear edge of the bottom plate. These vent holes cooperate with the upper vent holes 148 to create a chimney effect for circulating air through the closed enclosure 110. Air heated by the electrical equipment will rise and escape through the upper vent holes 148. The departing air is replaced by cooler, ambient air entering through the lower vent holes 150. This naturally induced air flow helps prevent the electrical equipment in the enclosure from overheating.

The bottom plate 130 further includes a plurality of knockouts 152. The knockouts can be removed in the usual manner to provide access openings for conduit or electrical cables entering the enclosure.

Figures 25, 26:
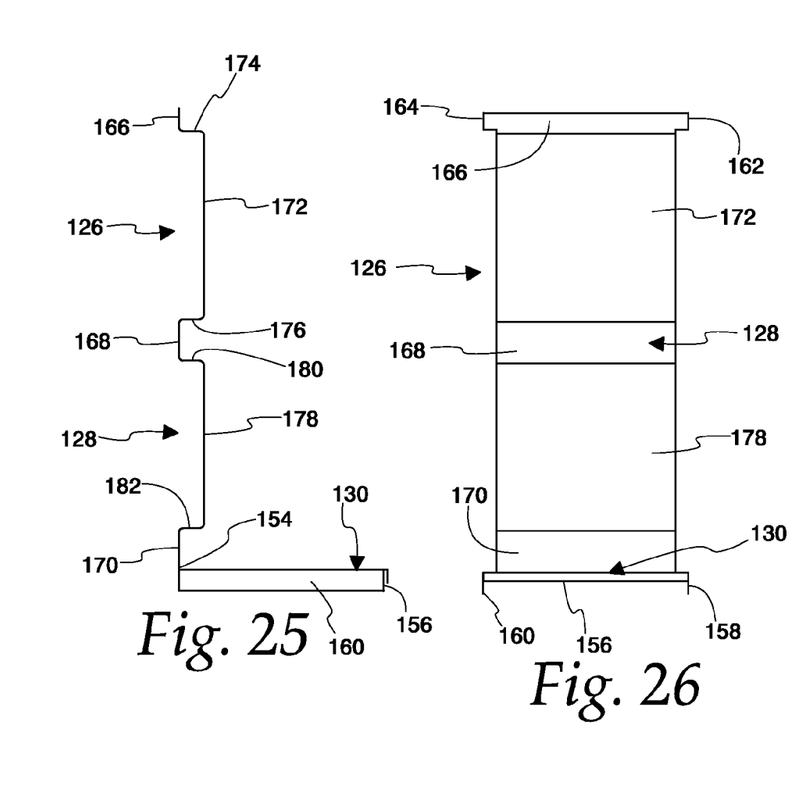
FIG. 25 is a front elevation view of the insert.
FIG. 26 is a side elevation view of the insert.

Further details of the insert 126 are best seen in FIGS. 25-26. The generally vertical back plate 128 is joined at a fold line 154 to the generally horizontal bottom plate 130. The bottom plate 130 has a downwardly-extending lip 156 on its front edge. The vertical extent of the lip is small enough to prevent interference with a tool, such as a wrench, accessing nuts for conduit connectors and the like located on the underside face of the bottom plate 130. The lip 156 extends the full width of the bottom plate 130. The side edges of the bottom plate have depending flaps 158, 160 extending in a vertical plane below the bottom plate a distance beyond the extent of the lip 156. The flaps provide an anchoring location for fastening the lower portion of the insert 126 to the outer shell 122. That is, the flap 158 is cinched to the side wall 134 and the flap 160 is cinched to the side wall 136.

The width of the bottom plate 130, including the flaps 158, 160, is slightly less than the internal distance between the side walls 134, 136, with only sufficient clearance to allow the bottom plate to slide in between the side walls during assembly of the case 112. Thus, there is effectively no lateral play between the flaps 158, 160 and the side walls 134, 136. As a result the bottom plate 130 and its flaps effectively center the lower portion of the insert 126 in the outer shell 122. The upper portion of the insert is centered in the outer shell by a pair of laterally extending tabs 162, 164. The distance from the vertical, free edge of one tab 162 to the vertical, free edge of the other tab 164 is the same as the width of the bottom plate 130 plus flaps 158, 160. Accordingly, the tabs 162, 164 center the insert 126 in the outer shell 122. This built-in, automatic centering function of the bottom plate 130 and tabs 162, 164 greatly simplifies assembly of the case 112 and assures the parts are fastened together in the proper relationships to one another.

The back plate 128 has a somewhat corrugated configuration as seen in the side elevation view of FIG. 26. As such the back plate includes vertical upper, center and lower mounting portions 166, 168 and 170, respectively. When the insert is in its assembled position, the mounting portions are in engagement with the back wall 132 of the outer shell 122. This provides areas of solid contact between the insert and outer shell where the two parts can be fastened together. Each of the mounting portions 166, 168 and 170 are cinched to the back wall 132.

In between the upper and center mounting portions 166, 168 there is an upper platform 172. An upper leg 174 and a lower leg 176 extend from the mounting portions to the upper platform 172, thereby spacing the platform forwardly from the mounting portions 166, 168. A similar lower platform 178 is disposed between the center and lower mounting portions 168, 170. Upper and lower legs 180, 182 space the lower platform 178 forwardly of the adjacent mounting portions. The upper and lower platforms 172 and 178 provide a suitable mounting location for the electrical equipment. Since the platforms are spaced from the back wall 132 of the outer shell, mounting the electrical equipment on one or both of the platforms 172, 178 assures there will be separation between the electrical equipment and the outer shell 122 of the case 112. This spacing helps dissipate heat from electrical equipment, such as transformers, and protects the surrounding environment from heat generated by the electrical equipment.

Figure 27:
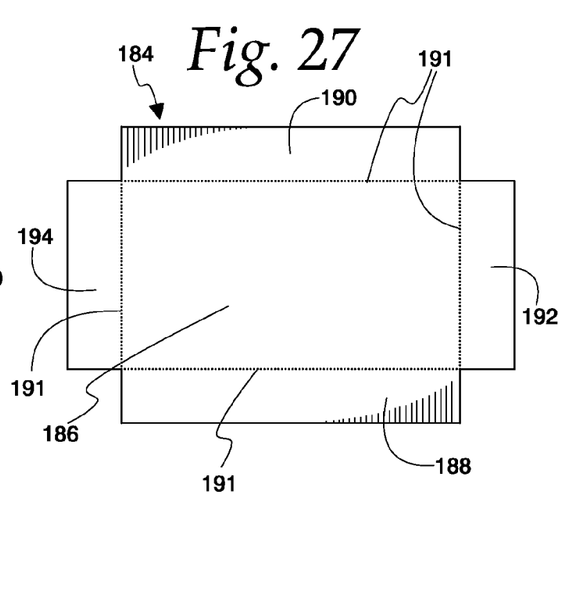
FIG. 27 is a top plan view of the sheet metal blank for the top cap, prior to final forming of the cap.

A blank 184 for the top cap 124 is shown in FIG. 27, prior to final forming of the top cap. The blank includes a rectangular body portion 186 bounded on all four sides by skirt segments. There are front and rear skirt segments 188 and 190 and right and left skirt segments 192 and 194. After formation of the blank 184 the skirt segments 188-194 are bent down about fold lines 191 to form a five-sided, three-dimensional structure. The distance between the internal faces of the right and left skirt segments is slightly greater than the distance between the free, outside edges of the ears 144, 146 on the outer shell's side walls. Thus, there is only a slight clearance between the top cap and the ears, just enough to allow the top cap to slide on the top of the outer shell. Accordingly, the ears 144, 146 center the top cap 124 on the outer shell 122. The top cap is cinched to the ears. Again, this self-centering structure simplifies assembly of the case and assures correct alignment of the parts.

It will be noted that the alignment of the top cap 124 spaces the right and left skirt segments 192, 194 from the right and left side walls 134, 136, respectively. This leaves the upper vent holes 148 unobstructed and provides an umbrella or hood over the vent holes. Similarly, the front skirt segment is spaced forwardly of the stand-off flanges 140, 142 and permits the cover 114 to fit underneath the top cap at the upper end of the case 112. However, the rear skirt segment is essentially flush up against the back wall 132 of the outer shell. This arrangement prevents entry of water, ice or snow into the upper vent holes 148 or underneath the top edge of the cover 114. In a similar regard, it will be further noted that the bottom plate 130 is recessed upwardly from the lowermost edges of the outer shell 122 and cover 114. This provides a hood around the bottom plate 130 that affords resistance to entry of moisture through the lower vent holes 150 or the knockouts 152.

Figure 28:
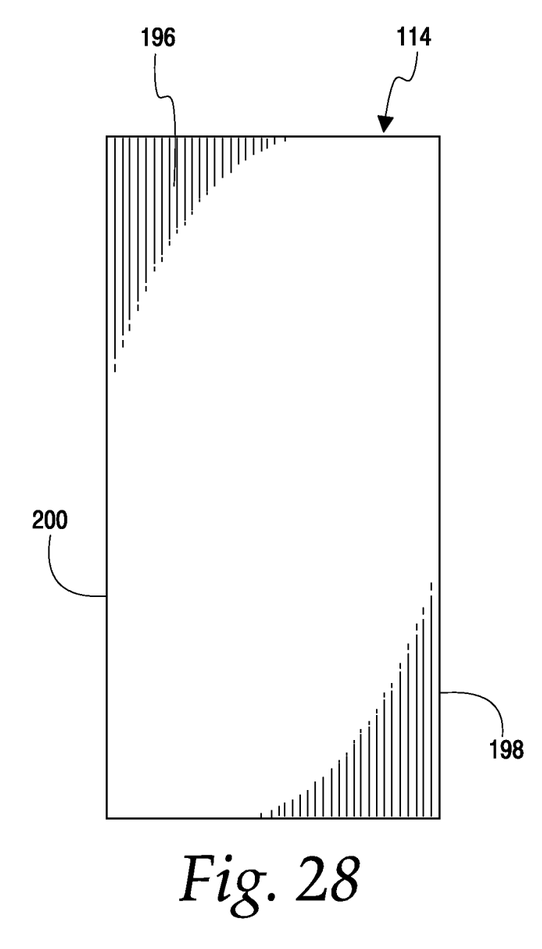
FIG. 28 is a front elevation view of the cover.
Figure 29:
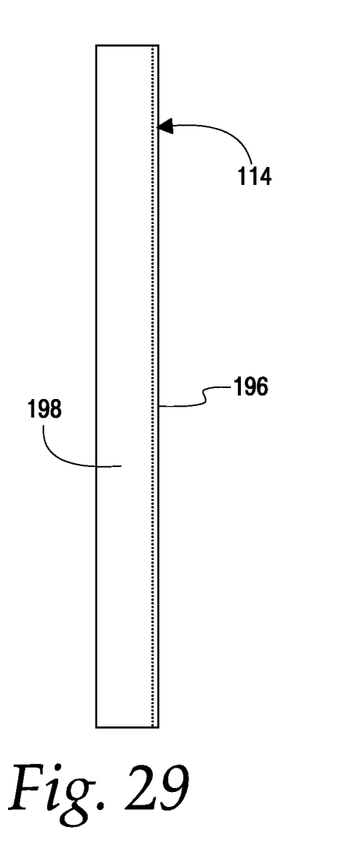
FIG. 29 is a side elevation view of the cover.
Figure 30:
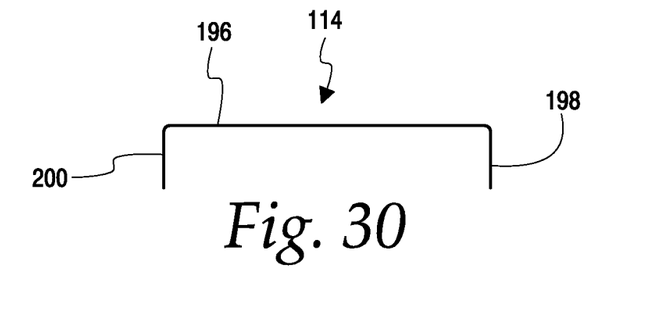
FIG. 30 is a top plan view of the cover.

The cover 114 is shown in detail in FIGS. 28-30. The cover is a simple channel section having a rectangular body portion 196 bounded on either side by flanges 198 and 200 which extend out of the plane of the body portion. The separation between the facing surfaces of the flanges 198-200 is slightly greater than the distance between the outer or free edges of the stand-off flanges 140, 142. As such, the stand-off flanges center the cover 114 on the case 112. The screws 120 fit through screw holes 121 in the body portion 196 to fasten the cover to the case.

The electrical box is designed so that all entering and exiting electrical connections are in bottom of the box. In this location all penetrations into the box are protected from direct contact from rain/snow etc. The box is also designed to maintain a minimum of ½ inch clearance on the exterior of the box in all directions. In other words, the design of the box prevents it from being mounted closer than ½ inch to surrounding structures, e.g., walls, ceilings, shelves, etc. To improve access to the interior of the box, the case's open side and removable cover are located at the front of the box. This also makes installation easier. Installation is further enhanced by the fact that the box is anchored through portions of the back plate that make full contact with the back wall of the outer shell.

The top cap of the case forms an umbrella over the ventilation holes of the case side walls and also over the front face plate. Further, the back wall, side walls and front cover form an umbrella over the bottom plate.

It should be understood that various changes and modifications to the presently preferred embodiments described herein will be apparent to those skilled in the art. Such changes and modification can be made without departing from the spirit and scope of the invention disclosed herein. For example, while the pocket plates are shown as more or less continuous planar sheets, the pocket plates could be discontinuous, such as a series of parallel fingers or studs engageable with the electrical device to hold it in place. Also, different mounting locations for the pocket plates are possible. For example, while the second and fourth pocket plates are shown attached to the separator flanges, they could also be attached to the side walls. Similarly, the first and third pocket plates could be attached to the back wall of the shell instead of to the second and fourth pocket plates. Furthermore, the first and third pocket plates are described as movable due to flexing of the insert. They could also be movable in some other manner, such as making them laterally slidable in slots formed in the case, with a set screw or the like to releasably hold the pocket plates in a desired position.

The invention claimed is:

1. An enclosure for an electrical device, comprising:
    a case including a back wall, left and right side walls, a top wall joined to at least one of the back wall and side walls at the upper end of the case, and a bottom wall joined to at least one of the back wall and side walls at the lower end of the case, the back, side, top and bottom walls forming a generally five-sided enclosure defining an open side and a cavity therein;
    a cover removably attachable to the case such that when attached to the case the cover closes the open side of the enclosure;
    first and second pocket plates mounted in the cavity of the case, the first pocket plate having a forward edge closest to the open side of the case, the forward edge being spaced from the open side of the enclosure such that when the cover is attached to the case the forward edge is spaced from the cover, the second pocket plate being spaced from the back wall of the case;
    the first and second pocket plates together with one of the side walls of the case defining a first compartment within the cavity for receiving the electrical device, said one of the side walls being in facing relation with the first pocket plate, and the forward edge of the first pocket plate and said one of the side walls defining an opening into said compartment and wherein the first pocket plate is movable to permit adjustment of the size of the opening into said compartment.

2. The enclosure of claim 1 wherein the first pocket plate has a rest position and can be flexed from the rest position in a direction away from said one of the side walls to permit enlargement of the opening into said compartment.

3. The enclosure of claim 2 wherein the first pocket plate when flexed away from the rest position of the first pocket plate is biased back toward the rest position.

4. The enclosure of claim 1 further comprising a foot attached to one of the pocket plates, the foot being spaced from the bottom wall of the case.

5. The enclosure of claim 1 further comprising a head attached to one of the pocket plates, the head being spaced from the top wall of the case.

6. The enclosure of claim 1 further comprising:
    third and fourth pocket plates mounted in the cavity of the case, the third pocket plate having a forward edge closest to the open side of the case, the fourth pocket plate being spaced from the back wall of the case;
    the third and fourth pocket plates together with the other of the side walls of the case defining a second compartment within the cavity for receiving a second electrical device, said other of the side walls being in facing relation with the third pocket plate, and the forward edge of the third pocket plate and said other of the side walls defining an opening into said second compartment.

7. The enclosure of claim 6 wherein the third pocket plate is movable to permit adjustment of the size of the opening into said second compartment.

8. The enclosure of claim 7 wherein the third pocket plate has a rest position and can be flexed from the rest position in a direction away from said other of the side walls to permit enlargement of the opening into said second compartment.

9. The enclosure of claim 8 wherein the third pocket plate when flexed away from the rest position of the third pocket plate is biased back toward the rest position.

10. The enclosure of claim 1 further comprising a spacer in the compartment between said one of the side walls and the first pocket plate.

11. An enclosure for an electrical device, comprising:
a case including a back wall, left and right side walls, a top wall joined to at least one of the back wall and side walls at the upper end of the case, and a bottom wall joined to at least one of the back wall and side walls at the lower end of the case, the back, side, top and bottom walls forming a generally five-sided enclosure defining an open side and a cavity therein;
a cover removably attachable to the case such that when attached to the case the cover closes the open side of the enclosure;
first and second pocket plates mounted in the cavity of the case, the first pocket plate having a forward edge closest to the open side of the case, the forward edge being spaced from the open side of the enclosure such that when the cover is attached to the case the forward edge is spaced from the cover, the second pocket plate being spaced from the back wall of the case; and
a separator flange connected to the back wall and extending therefrom toward the open side of the case and wherein the second pocket plate is connected to the separator flange.

12. The enclosure of claim 11 wherein the first pocket plate is attached to the second pocket plate and wherein the first pocket plate has a rest position and can be flexed from the rest position in a direction away from the side wall to permit enlargement of the opening into said compartment.

13. The enclosure of claim 12 wherein the first pocket plate when at the rest position of the first pocket plate is angled with respect to the side wall.

14. The enclosure of claim 11 further comprising a rear plate attached to the back wall of the case and wherein the separator flange is attached to the rear plate.

15. The enclosure of claim 14 further comprising:
third and fourth pocket plates mounted in the cavity of the case, the third pocket plate having a forward edge closest to the open side of the case, the fourth pocket plate being spaced from the back wall of the case; the third and fourth pocket plates together with the other of the side walls of the case defining a second compartment within the cavity for receiving a second electrical device, said other of the side walls being in facing relation with the third pocket plate, and the forward edge of the third pocket plate and said other of the side walls defining an opening into said second compartment; and
a second separator flange connected to the rear plate and extending therefrom toward the open side of the case and wherein the fourth pocket plate is connected to the separator flange.

16. An enclosure for an electrical device, comprising:
a case including a back wall, left and right side walls, a top wall joined to at least one of the back wall and side walls at the upper end of the case, and a bottom wall joined to at least one of the back wall and side walls at the lower end of the case, the back, side, top and bottom walls forming a generally five-sided enclosure defining an open side and a cavity therein;
a cover removably attachable to the case such that when attached to the case the cover closes the open side of the enclosure;
an insert in the cavity and having first and second pocket plates defining a compartment within the cavity for receiving and retaining the electrical device, one of the pocket plates being in facing relation with a side wall and defining an opening into said compartment, the first pocket plate having a forward edge closest to the open side of the case, the forward edge being spaced from the open side of the enclosure such that when the cover is attached to the case the forward edge is spaced from the cover.

17. The enclosure of claim 16 wherein at least one of the pocket plates is flexible to permit insertion of an electrical device into the compartment, said one of the pocket plates thereafter being biased into engagement with the electrical device to retain it in the pocket.

18. The enclosure of claim 16 further comprising a separator flange connected to the back wall and extending therefrom toward the open side of the case and wherein the second pocket plate is parallel to the back wall and connected to the separator flange.

19. The enclosure of claim 18 wherein the first pocket plate is attached to the second pocket plate and wherein the first pocket plate has a rest position and can be flexed from the rest position in a direction away from the side wall to permit enlargement of the opening.

20. The enclosure of claim 19 wherein the first pocket plate when in the rest position of the first pocket plate is angled with respect to the side wall.

* * * * *